United States Patent
Zhang

[11] Patent Number: 6,125,821
[45] Date of Patent: Oct. 3, 2000

[54] METHOD AND DEVICE FOR CONTROLLING AN INTERNAL COMBUSTION ENGINE

[75] Inventor: Hong Zhang, Regensburg, Germany

[73] Assignee: Siemens Aktiengesellschaft, Munich, Germany

[21] Appl. No.: 09/243,514

[22] Filed: Feb. 1, 1999

[30] Foreign Application Priority Data

Jan. 30, 1998 [DE] Germany .......................... 198 03 664

[51] Int. Cl.$^7$ .................................................. F02D 41/14
[52] U.S. Cl. ............................................................ 123/350
[58] Field of Search .................................. 123/336, 350, 123/327

[56] References Cited

U.S. PATENT DOCUMENTS 4,335,689  6/1982  Abe et al. ................................ 123/336

FOREIGN PATENT DOCUMENTS

| 0265968A2 | 5/1988 | European Pat. Off. . |
| 3228393C2 | 2/1989 | Germany . |
| 19612451A1 | 10/1997 | Germany . |

*Primary Examiner*—Andrew M. Dolinar
*Attorney, Agent, or Firm*—Herbert L. Lerner; Laurence A. Greenberg; Werner H. Stemer

[57] ABSTRACT

A throttle valve is arranged in an air intake pipe of an internal combustion engine. A valve is arranged in a bypass of the intake pipe. The gas pedal is mechanically coupled to the throttle valve. A setpoint value of the torque is determined in dependence on the position of the gas pedal and of torque requests defined by control functions. A setpoint value of a variable that determines the mass flow in the intake pipe is determined as a function of the setpoint value of the torque. An actual value of the variable that determines the mass flow in the intake pipe is determined as a function of the position of the gas pedal. An actuating signal for controlling the valve is determined as a function of the setpoint value and the actual value.

8 Claims, 2 Drawing Sheets

METHOD AND DEVICE FOR CONTROLLING AN INTERNAL COMBUSTION ENGINE

BACKGROUND OF THE INVENTION

1. Field of the Invention

The invention belongs to the automotive art. Specifically, the invention relates to a method and a device for controlling an internal combustion engine.

2. Description of the Related Art

German published patent application DE 196 12 451 discloses a method and a device for controlling an internal combustion engine. An air intake and a bypass of the air intake are assigned to the internal combustion engine. A throttle valve is arranged in the air intake. A valve is arranged in the bypass. Electromotive drives are provided as actuator drive for the throttle valve and the valve. A setpoint value of the torque at the crankshaft is determined as a function of the position of the gas pedal and is corrected as a function of pilot control values which are determined from control functions of the internal combustion engine. A setpoint value of a reduced sectional flow area at the throttle valve is determined as a function of the setpoint value of the torque. An actuating signal for the actuator drive of the throttle valve is then determined from the former.

Such methods and devices ensure precise control of the internal combustion engine. They relate all the influencing variables of the control to the torque of the crankshaft. In this way, the individual functions can be formed simply and independently of one another. They can be provided in any desired combination in engine controllers without a large degree of expenditure on application. However, until now their use has been restricted to internal combustion engines whose throttle valve is controlled electromotively (E-Gas).

SUMMARY OF THE INVENTION

It is accordingly an object of the invention to provide a method and device for controlling an internal combustion engine, which overcomes the above-mentioned disadvantages of the heretofore-known devices and methods of this general type and which is improved in such a way that it can also be used for an internal combustion engine with a throttle valve that is mechanically coupled to the gas pedal.

With the foregoing and other objects in view there is provided, in accordance with the invention, a method of controlling an internal combustion engine with an intake tract having a throttle valve in an intake pipe, and a valve arranged in a bypass of the intake pipe, wherein a gas pedal is mechanically coupled to the throttle valve, and a sensor is disposed to sense a position of the gas pedal, wherein the method comprises:

determining a setpoint value of a torque at the crankshaft or an output shaft which is mechanically coupled to the crankshaft is determined as a function of the position of the gas pedal and of torque requests of control functions of the internal combustion engine, determining a setpoint value of a variable defining a mass flow in the intake pipe as a function of the setpoint value of the torque;

determining an actual value of the variable defining the mass flow in the intake pipe as a function of the position of the gas pedal; and determining an actuating signal for controlling the valve as a function of the setpoint value and the actual value of the variable defining the mass flow in the intake pipe.

In accordance with an added feature of the invention, the variable defining the mass flow in the intake pipe is a reduced sectional flow area at the throttle valve.

In accordance with an additional feature of the invention, a further reduced sectional flow area at the valve is determined by forming a difference between the setpoint value and the actual value of the reduced sectional flow area, and an adaptation value is determined if the further reduced sectional flow area fulfills a predefined condition.

In accordance with another feature of the invention, the predefined condition is considered fulfilled if the value of the further reduced sectional flow area is smaller than a predefined minimum value for longer than a predefined time period.

In accordance with a further feature of the invention, the adaptation value is initialized with a neutral value and the adaptation value is incrementally changed if the predefined condition is fulfilled until the further reduced sectional flow area is greater than the minimum value.

In accordance with again a further feature of the invention, a degree of opening of the throttle valve is sensed with the sensor for sensing the position of the gas pedal.

With the above and other objects in view there is also provided, in accordance with a concomitant feature of the invention, a device for controlling an internal combustion engine. The combustion engine drives a crankshaft and an intake tract communicates with the engine. A throttle valve is arranged in an intake pipe of the intake tract, and a valve is arranged in a bypass of the intake pipe. The gas pedal or accelerator pedal is mechanically coupled to the throttle valve, and a sensor senses a position of the gas pedal. The device for controlling the internal combustion engine, comprises:

means for determining a setpoint value of a torque at one of a crankshaft and an output shaft mechanically coupled to the crankshaft as a function of a position of the gas pedal and of torque requests defined by control functions of the internal combustion engine;

means for determining a setpoint value of a variable defining a mass flow in the intake pipe as a function of the setpoint value of the torque;

means for determining an actual value of the variable defining the mass flow in the intake pipe, at the throttle valve as a function of the position of the gas pedal; and means for determining an actuating signal for controlling the valve as a function of the setpoint value and the actual value of the variable defining the mass flow in the intake pipe.

The solution according to the invention is distinguished by the fact that it ensures precise control of an internal combustion engine with a throttle valve which is mechanically coupled to the gas pedal. It makes it possible to use controllers for internal combustion engines with an electromotively activated throttle valve with a low degree of expenditure on adaptation even for more cost-effective internal combustion engines with throttle valves that are mechanically coupled to the gas pedal. Furthermore, it ensures comfortable control of the internal combustion engine.

Other features which are considered as characteristic for the invention are set forth in the appended claims.

Although the invention is illustrated and described herein as embodied in a method and device for controlling an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
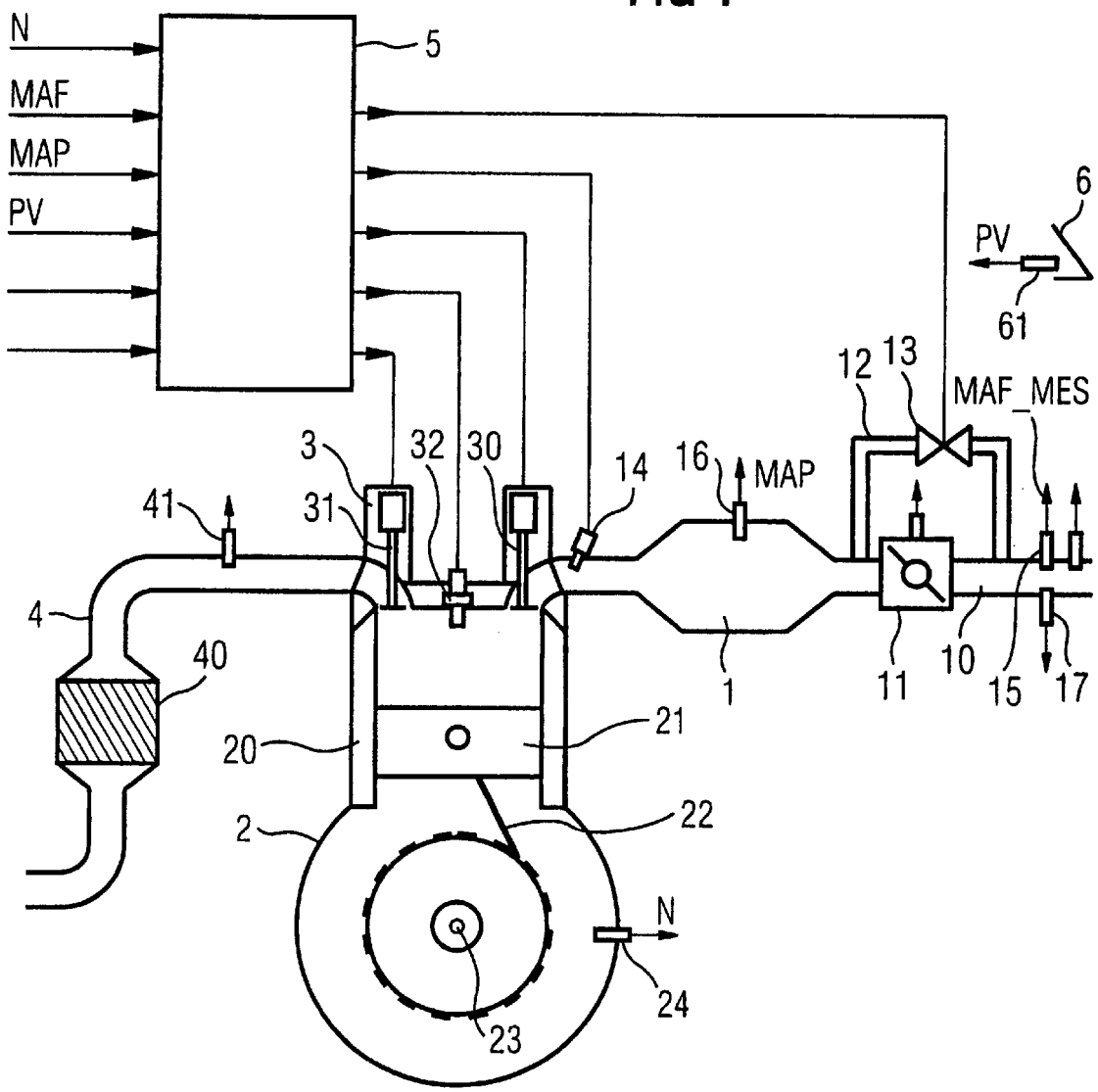
FIG. 1 is a partly schematic diagram of an internal combustion engine with a control device.

Referring now to the figures of the drawing in detail and first, particularly, to FIG. 1 thereof, there is seen an internal combustion engine (ICE) comprises an intake tract 1 having an air intake 10 or intake pipe 10 in which a throttle valve 11 is arranged. A bypass 12 of the air intake has a valve 13. An injection valve 14 for metering fuel is arranged in the intake tract 1. The internal combustion engine also comprises an engine block 2, which has a cylinder 20 and a crankshaft 23. A piston 21 and a connecting rod 22 are assigned to the cylinder 20. The connecting rod 22 connects the piston 21 to the crankshaft 23.

A cylinder head 3 is provided and in it a valve drive with at least one intake valve 30 and one exhaust valve 31 is arranged. In addition, a spark plug 32 is mounted in the cylinder head 3. If the internal combustion engine is an auto-ignition internal combustion engine, of course, no spark plug 32 is provided, and instead an injection valve or, if appropriate, an injection pump and an injection nozzle are provided. The internal combustion engine is illustrated in FIG. 1 with a cylinder 20. It is understood, however, that the engine may comprise a plurality of cylinders.

An exhaust gas tract 4 is provided and in it a catalytic converter 40 and an oxygen probe 41 are arranged.

Sensors which sense various measurement variables and each determine the measured value of the measurement variable are assigned to a control device 5 for the internal combustion engine. The control device 5 determines, as a function of at least one measurement variable, actuating signals which control one or more actuators. The sensors include a gas pedal sensor 61, which senses a gas pedal position PV of an accelerator pedal 6, an air mass flow meter 15, which determines a measured value MAF_MES of the air mass flow and/or an intake pipe pressure sensor 16, which senses an intake pipe pressure MAP. Further, a temperature sensor 17 senses an intake air temperature, a rotational speed sensor 24 senses a rotational speed N of the crankshaft 23, i.e. the engine speed N, the oxygen probe 41 senses the residual oxygen of the exhaust gas and assigns an excess air factor to the latter. Depending on the embodiment, any desired subset of the aforesaid sensors or even additional sensors may be present. Thus, in one embodiment a throttle valve position sensor is provided instead of the accelerator pedal sensor 61. The measured value of the throttle valve position sensor represents the position of the gas pedal, since the gas pedal is mechanically coupled to the throttle valve. An observer, which comprises a physical model of the intake tract and which calculates estimated values of the air mass flow in the vicinity of the air mass flow meter 15, and estimated values of the mass flow in the cylinder 20, of the intake pipe pressure and of the ambient pressure, is also preferably provided.

The actuators each comprise an actuator drive and an actuator element. The actuator drive is an electromotive drive, an electromagnetic drive or a further drive which is known to those of skill in the art. The actuator elements are implemented as the valve 13, as the injection valve 14 or the spark plug 32. Below, reference is made in each case to the actuators by way of the associated actuator element.

The control device 5 is preferably implemented as an electronic engine controller. However, it may also comprise a plurality of control units which are connected to one another in an electrically conducting fashion, for example through a bus system.

Figure 2:
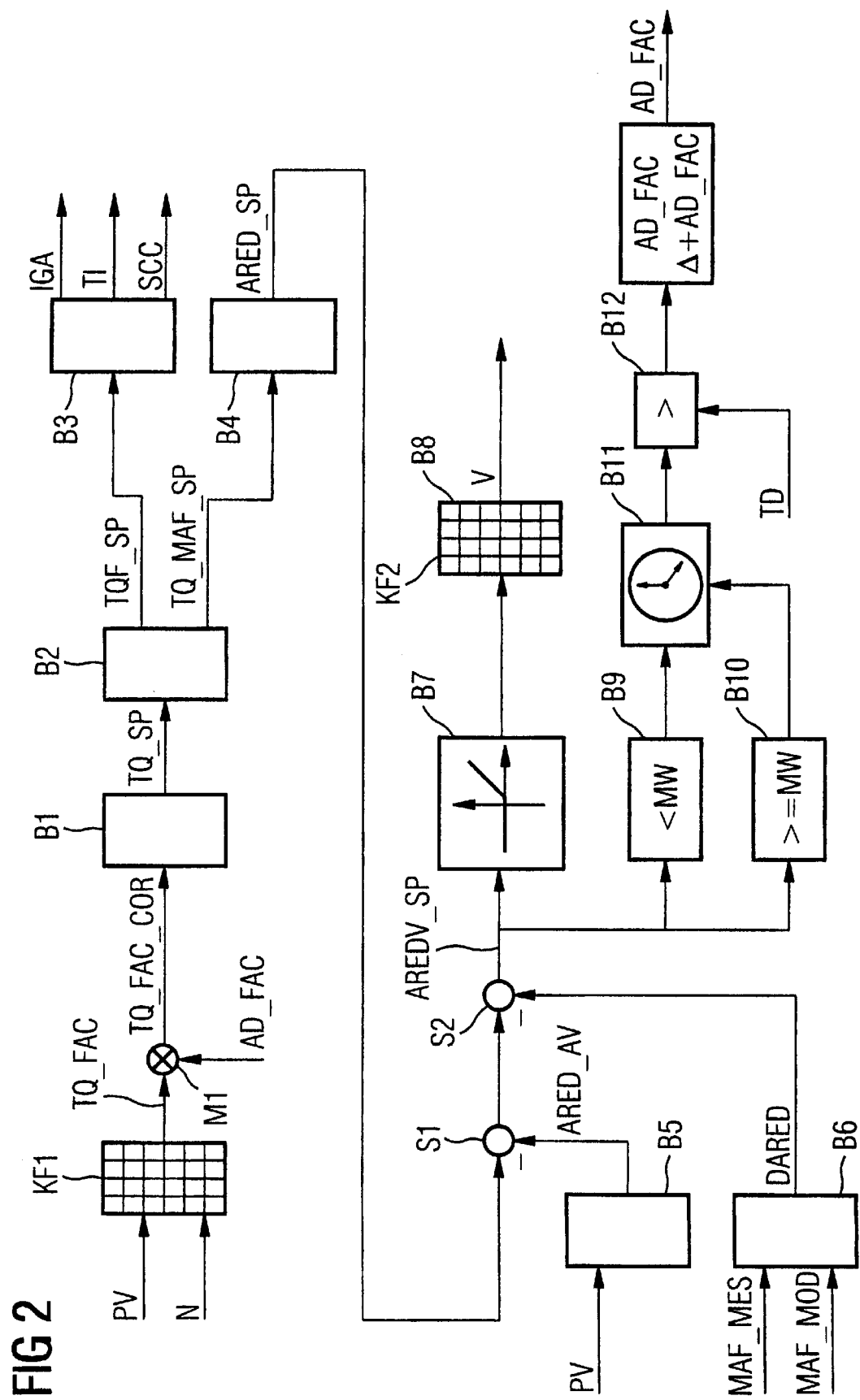
FIG. 2 is a block circuit diagram of the control device.

Referring now to FIG. 2, there is shown a block circuit diagram of a preferred embodiment of the control device 5. In one characteristic diagram KF1, a torque factor TQ_FAC is determined as a function of the position PV of the gas pedal and the rotational speed N. At a multiplier point M1, the torque factor TQ_FAC is multiplied by an adaptation factor AD_FAC. The adaptation factor AD_FAC is described further below.

In a block B1, a setpoint value TQ_SP of the desired torque of the crankshaft 23 is determined in dependence on the corrected torque factor TQ_FAC_COR, which is determined in the multiplier point M1, and on estimated values for the minimum and maximum values of the torque which is available at the crankshaft. It is also possible to provide in the block B1 a function for load shift damping which filters the setpoint value TQ_SP of the desired torque in such a way that there are no sudden severe changes in the torque, which the driver perceives as unpleasant load shifts.

In a block B2, a setpoint value TQF_SP of a torque which is to be established quickly and a setpoint value TQ_MAF_SP of the torque which is to be established by means of the charge, are determined. In each case both the setpoint value TQ_SP of the torque desired by the driver and also torque requests of control functions of the internal combustion engine are taken into account. Such control functions are, for example, an idling control, an anti-slip control, an engine torque control, a speed limitation, a catalytic converter heating function or a catalytic converter protective function.

In a block B3, appropriate ignition angle signals IGA, injection period signals TI and/or a cylinder shut-off signal SCC are determined as a function of the setpoint value TQF_SP of the torque which is to be established quickly, and the actuator drives which are assigned to the corresponding actuator elements are driven.

In a block B4, a setpoint value ARED_SP of a reduced sectional flow area at the throttle valve 11 is determined by means of a model of the intake tract. The friction losses and the flow losses at the throttle point are taken into account by means of the reduced sectional flow area.

In a block B5, an actual value ARED_AV of the reduced sectional flow area at the throttle valve 11 is determined as a function of the position PV of the gas pedal. The calculation takes place in the block B5 as a function of stored characteristic diagram values.

The position PV of the gas pedal is proportional to the degree of opening of the throttle valve, since the gas pedal is mechanically coupled to the throttle valve. It is thus easily possible to determine the actual value ARED_AV of the reduced sectional flow area at the throttle valve 11.

At a summing point Si, the difference between the setpoint value ARED_SP and the actual value ARED_AV of the reduced sectional flow area at the throttle valve is formed.

In a block B6, a correction value DARED is determined as a function of the measured value MAF_MES and an estimated value MAF_MOD of the air mass flow. As a result, modeling inaccuracies of the model of the intake tract can be corrected.

The difference between the output variable of the summing point Si and the correction value DARED at the summing point S2 is then assigned to a setpoint value AREDV_SP of the reduced sectional flow area at the valve in the bypass 12. In a block B7, the setpoint value AREDV_SP is then limited to a predefined minimum value MW (for example 0). In a block B8, the actuating signal V for the valve 13 is then determined from a characteristic curve or a characteristic diagram KF2. Thus, the setpoint value TQ_MAF_SP can be set up by means of the valve 13 independently of the degree of opening of the throttle valve.

In a block B9, it is tested whether the setpoint value AREDV_SP of the reduced sectional flow area at the valve 13 in the bypass 12 is smaller than the minimum value MW. If this is the case, a time counter in a block B11 is incremented. In a block B10, it is tested whether the setpoint value AREDV_SP is greater than or equal to the minimum value. If this is the case, the time counter in the block B11 is reset to an initialization value.

In a block B12, it is tested whether the time counter of the block B11 is greater than a value which corresponds to a predefined time period TD. If this is the case, the adaptation factor AD_FAC is increased by one delta value D in a block B13.

However, the blocks B9 to B13 are preferably processed only if no torque requests of the further control functions are present. The adaptation factor AD_FAC is permanently stored and, after the internal combustion engine is switched off, it is also available again to the internal combustion engine when it is switched on again. Errors in the model are corrected by means of the adaptation factor, and it is thus ensured that in the steady-state operating condition of the internal combustion engine the ignition angle is not adjusted out of the predefined optimum ignition angle position, and in this way the emissions are reduced.

It will be understood that the invention is not restricted to the exemplary embodiment described. Thus, for example, the variable which determines the mass flow in the intake pipe may not only be the reduced sectional flow area but also the degree of opening of the throttle valve 11.

The various above-described blocks B1, B2, ... B12 may be implemented as separate components, either in integrated form or in hardwired subcircuits. Alternatively, the blocks may be defined as software modules or subroutines which are functionally and/or physically combined in logical groups within the main control system and engine controller. Combinations of these implementations are possible as well.

I claim:

1. A method of controlling an internal combustion engine with an intake tract having a throttle valve in an intake pipe, and a valve arranged in a bypass of the intake pipe, wherein a gas pedal is mechanically coupled to the throttle valve, and a sensor is disposed to sense a position of the gas pedal, wherein the method comprises:

determining a setpoint value of a torque at the crankshaft or an output shaft mechanically coupled to the crankshaft as a function of the position of the gas pedal and of torque requests of control functions of the internal combustion engine;

determining a setpoint value of a variable defining a mass flow in the intake pipe as a function of the setpoint value of the torque;

determining an actual value of the variable defining the mass flow in the intake pipe as a function of the position of the gas pedal; and determining an actuating signal for controlling the valve in the bypass of the intake pipe as a function of the setpoint value of the variable defining the mass flow and the actual value of the variable defining the mass flow in the intake pipe.

2. The method according to claim 1, wherein the variable defining the mass flow in the intake pipe is a reduced sectional flow area at the throttle valve.

3. The method according to claim 2, which comprises determining a further reduced sectional flow area at the valve by forming a difference between the setpoint value and the actual values of the reduced sectional flow area, and determining an adaptation value if the further reduced sectional flow area fulfills a predefined condition.

4. The method according to claim 3, wherein the predefined condition is fulfilled if the value of the further reduced sectional flow area is smaller than a predefined minimum value for longer than a predefined time period.

5. The method according to claim 4, which further comprises initializing the adaptation value with a neutral value and incrementally changing the adaptation value if the predefined condition is fulfilled until the further reduced sectional flow area is greater than the minimum value.

6. The method according to claim 1, which comprises sensing a degree of opening of the throttle valve with the sensor for sensing the position of the gas pedal.

7. In a motor vehicle having an internal combustion engine, a crankshaft driving by the engine, an intake tract communicating with the engine, a throttle valve arranged in an intake pipe of the intake tract, and a valve arranged in a bypass of the intake pipe, wherein a gas pedal is mechanically coupled to the throttle valve, and a sensor senses a position of the gas pedal, a device for controlling the internal combustion engine, comprising:

means for determining a setpoint value of a torque at one of a crankshaft and an output shaft mechanically coupled to the crankshaft as a function of a position of the gas pedal and of torque requests defined by control functions of the internal combustion engine;

means for determining a setpoint value of a variable defining a mass flow in the intake pipe as a function of the setpoint value of the torque;

means for determining an actual value of the variable defining the mass flow in the intake pipe at the throttle valve as a function of the position of the gas pedal; and means for determining an actuating signal for controlling the valve as a function of the setpoint value and the actual value of the variable defining the mass flow in the intake pipe.

8. The device according to claim 7, wherein the sensor for sensing the position of the gas pedal is a sensor sensing a degree of opening of the throttle valve.

* * * * *